United States Patent [19]

Puckette

[11] 3,793,589

[45] Feb. 19, 1974

[54] DATA COMMUNICATION TRANSMITTER UTILIZING VECTOR WAVEFORM GENERATION

[75] Inventor: Charles McD. Puckette, Scotia, N.Y.

[73] Assignee: General Electric Company, Schenectady, N.Y.

[22] Filed: June 28, 1972

[21] Appl. No.: 267,248

[52] U.S. Cl....... 325/137, 235/150.52, 340/347 DD, 332/45

[51] Int. Cl............................................. H04b 1/68

[58] Field of Search.. 325/137, 442; 332/16, 22, 45, 332/44, 17; 235/197, 152, 150.52; 340/347 DA

[56] References Cited

UNITED STATES PATENTS

| | | | |
|---|---|---|---|
| 3,411,110 | 11/1968 | Walker | 332/44 |
| 3,469,080 | 9/1969 | Schmid et al. | 340/347 DA |
| 3,484,589 | 12/1969 | Jernakoff | 235/150.52 |
| 3,628,154 | 12/1971 | Weill | 325/435 |
| 3,525,941 | 8/1970 | Smith | 325/442 |
| 3,624,427 | 11/1971 | Dijkmans | 325/137 |
| 3,665,314 | 5/1972 | Leuthold | 325/137 X |

*Primary Examiner*—Benedict V. Safourek
*Attorney, Agent, or Firm*—Louis A. Moucha; Joseph T. Cohen; Jerome C. Squillaro

[57] ABSTRACT

A digitally implemented single sideband (SSB) transmitter simultaneously generates a desired signaling waveform in response to a single data signal input, multiplies it by a carrier function, generates the Hilbert transform of the signaling waveform and multiplies it by a quadrature carrier function, and sums the two products to produce the SSB output. The simultaneous processes are developed in a vector waveform generator which includes a plurality of tapped first resistors connected across conductors selectively supplied with in-phase, quadrature and 180° out-of-phase carrier frequency voltage signals. Each resistor tap point is connected through a switch and second resistor to a current summing amplifier, and outputs of a single tapped shift register close the switches for fixed short time periods to thereby generate amplitude and phase controlled carrier current signal samples which form the signaling waveform as well as simultaneously performing the other processes to produce the SSB output.

24 Claims, 9 Drawing Figures

PATENTED FEB 19 1974

3,793,589

SHEET 3 OF 5

DATA COMMUNICATION TRANSMITTER UTILIZING VECTOR WAVEFORM GENERATION

My invention relates to a data communication transmitter for high speed data transmission, and in particular, to a transmitter utilizing vector waveform generation for providing the capability of transmitting information at the Nyquist rate.

Data communication systems having a maximum information transmitting capability of two bits per Hertz of bandwidth are commonly described as transmitting information at the Nyquist rate. Thus, when transmitting at the Nyquist rate, a maximum data rate transmission of 4,800 bits per second can be achieved over a voice band telephone channel having a bandwidth of 2,400 Hertz, as one typical example. In order to achieve this capability of transmitting information at the Nyquist rate, the signaling waveform and modulation technique must be evaluated to insure that optimum use is made of the available channel bandwidth. This effort has led to the development of a group of waveforms, commonly known as partial response waveforms, that have very desirable spectral properties. A combining of the partial response waveform with single sideband (SSB) modulation makes possible the attainment of a data transmission system capable of transmitting information at the Nyquist rate.

The prior art has implemented the hereinabove described system by utilizing two tapped shift register waveform generators and a pair of linear multipliers to obtain the SSB output, however, such plurality of components significantly increases the cost of the transmitter as well as being incompatible for integration on a single integrated circuit chip.

Therefore, one of the principal objects of my invention is to provide a flexible in terms of waveform selection, low cost data communication system transmitter adapted for high speed data transmission.

Another object of my invention is to provide the transmitter with multi-transmission rate capability.

A further object of my invention is to provide the transmitter with the capability for being manufactured as a single integrated circuit.

A still further object of my invention is to provide the transmitter with capability for transmitting information at the Nyquist rate.

Another object of my invention is to provide the transmitter with a single waveform generator and without requiring any linear multipliers in the modulation process.

Briefly stated, and in accordance with my invention, I provide a data communication transmitter utilizing vector waveform generation for generating directly at the carrier frequency a desired signaling waveform in SSB modulated form, for transmission over a communication channel in response to a data signal input. The vector waveform generator portion of the transmitter includes a plurality of tapped first resistors each connected across a pair of conductors that are chosen from four conductors supplied with in-phase, quadrature and 180° out-of-phase carrier frequency voltage signals respectively. The carrier frequency voltage signals are supplied from a suitable frequency source means. Each resistor tap point is connected through a switch and second resistor to a current summing amplifier. At each resistor tap point there is developed a weighted sum of the two particular carrier voltage signals supplied to the selected conductors which represents a controlled phasing or vector rotation of the resultant carrier voltage signal. A digital control means such as a tapped shift register generates a train of contiguous pulses in response to a single data signal input, and the pulses sequentially close the switches for fixed short time periods to thereby generate amplitude and phase controlled carrier current signal samples which form the desired signaling waveform in SSB modulated form at the output of the current summing amplifier in response to the single data signal input to the shift register. The carrier frequency voltage signals are square waves and the entire vector waveform generator, except for the summing amplifier, is comprised of digital logic elements so that the waveform generator may be fabricated on a single integrated circuit chip.

The features of my invention which I desire to protect herein are pointed out with particularity in the appended claims. The invention itself, however, both as to its organization and method of operation, together with further objects and advantages thereof may best be understood by reference to the following description taken in connection with the accompanying drawings wherein like parts in each of the several figures are identified by the same reference character wherein:

Figure 3:
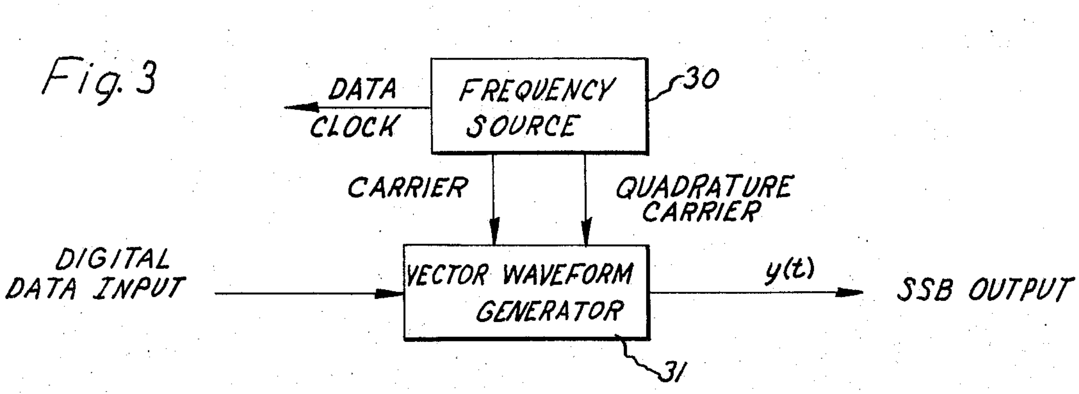
FIG. 3 is a general block diagram of a data communication transmitter in accordance with my invention for obtaining an SSB output.
Figure 4A:
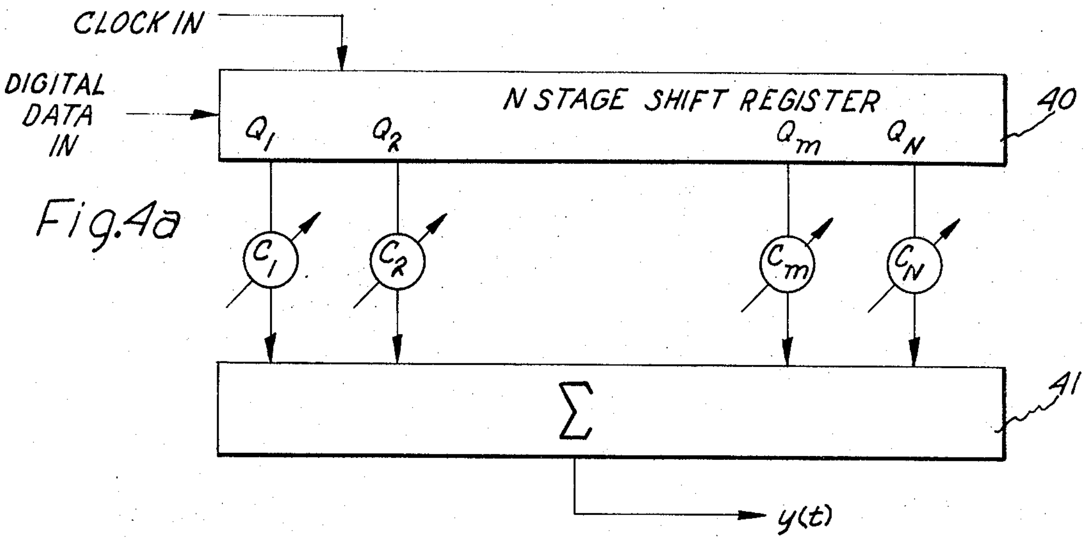
Figure 4B:
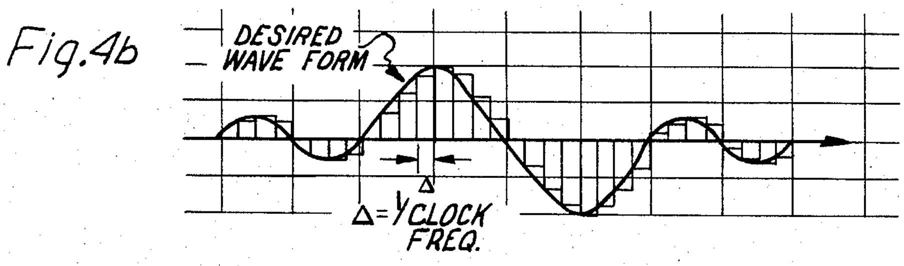
Figure 4C:
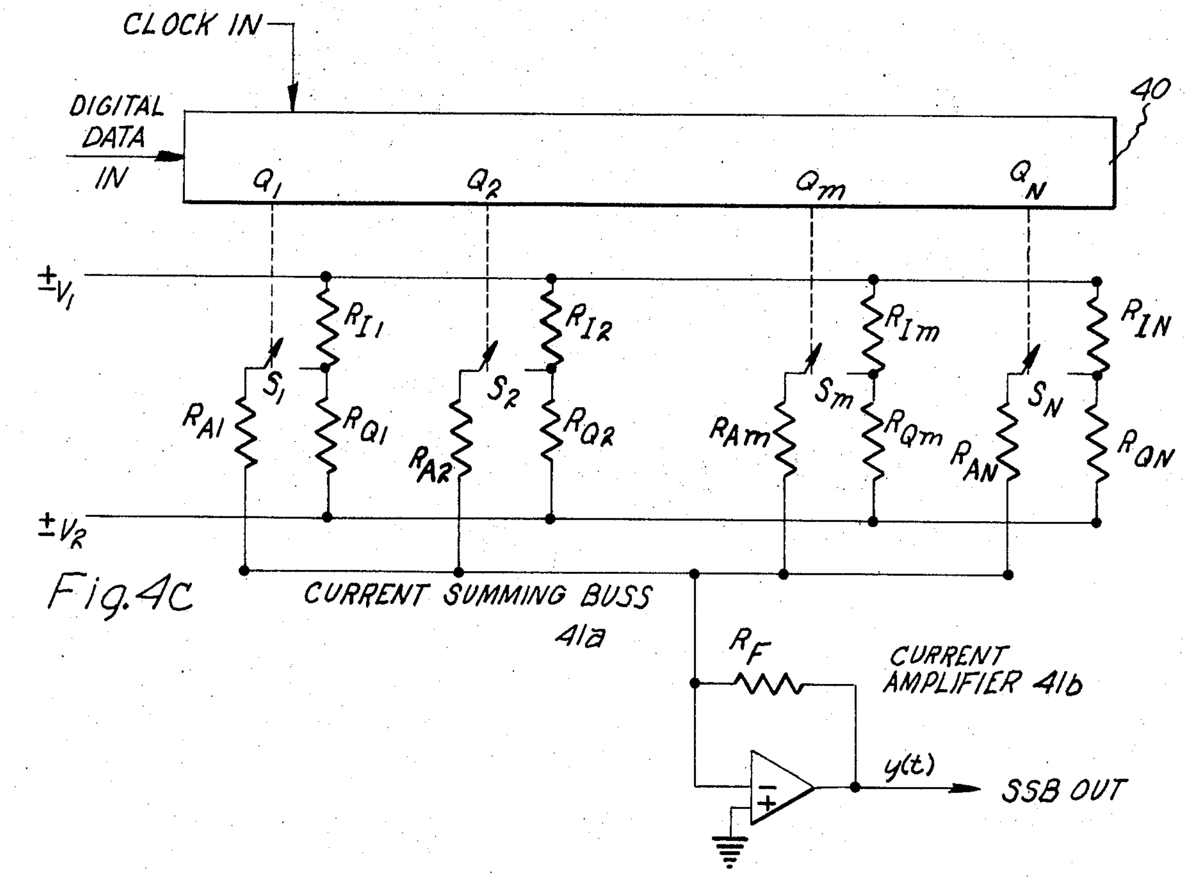

FIG. 4*a* is a general block diagram of the vector waveform generator portion of the transmitter in FIG. 3;

FIG. 4*b* is a time domain plot of a typical signaling waveform generated within my vector waveform generator illustrated in FIG. 4*a* as it would appear after demodulation;

FIG. 4*c* is a more detailed diagram, partly in schematic form, of the vector waveform generator illustrated in FIG. 4*a;*

Figure 4D:
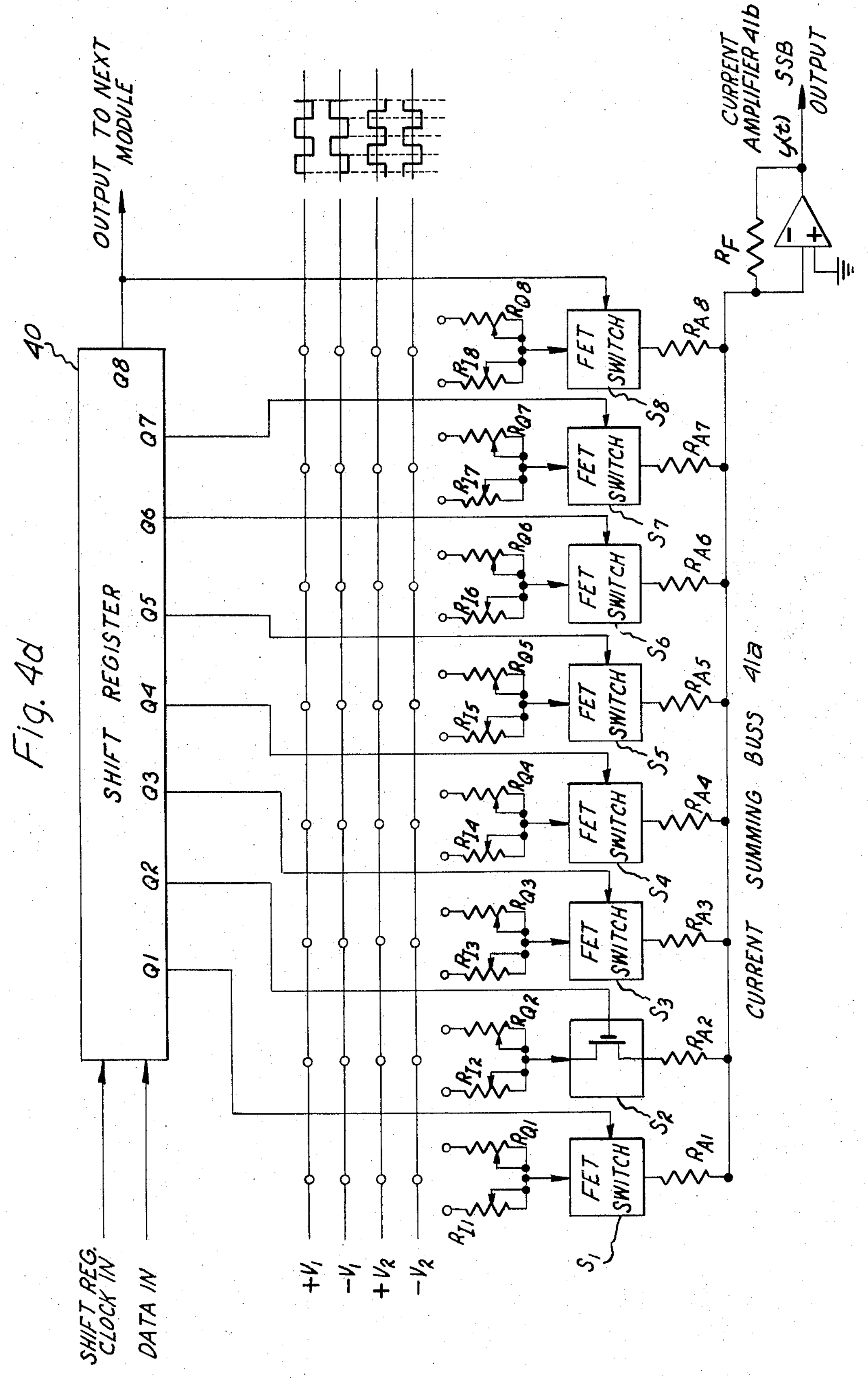

FIG. 4*d* is an even more detailed diagram, partly in schematic form, of the vector waveform generator illustrated in FIG. 4*a;*

Figure 5:
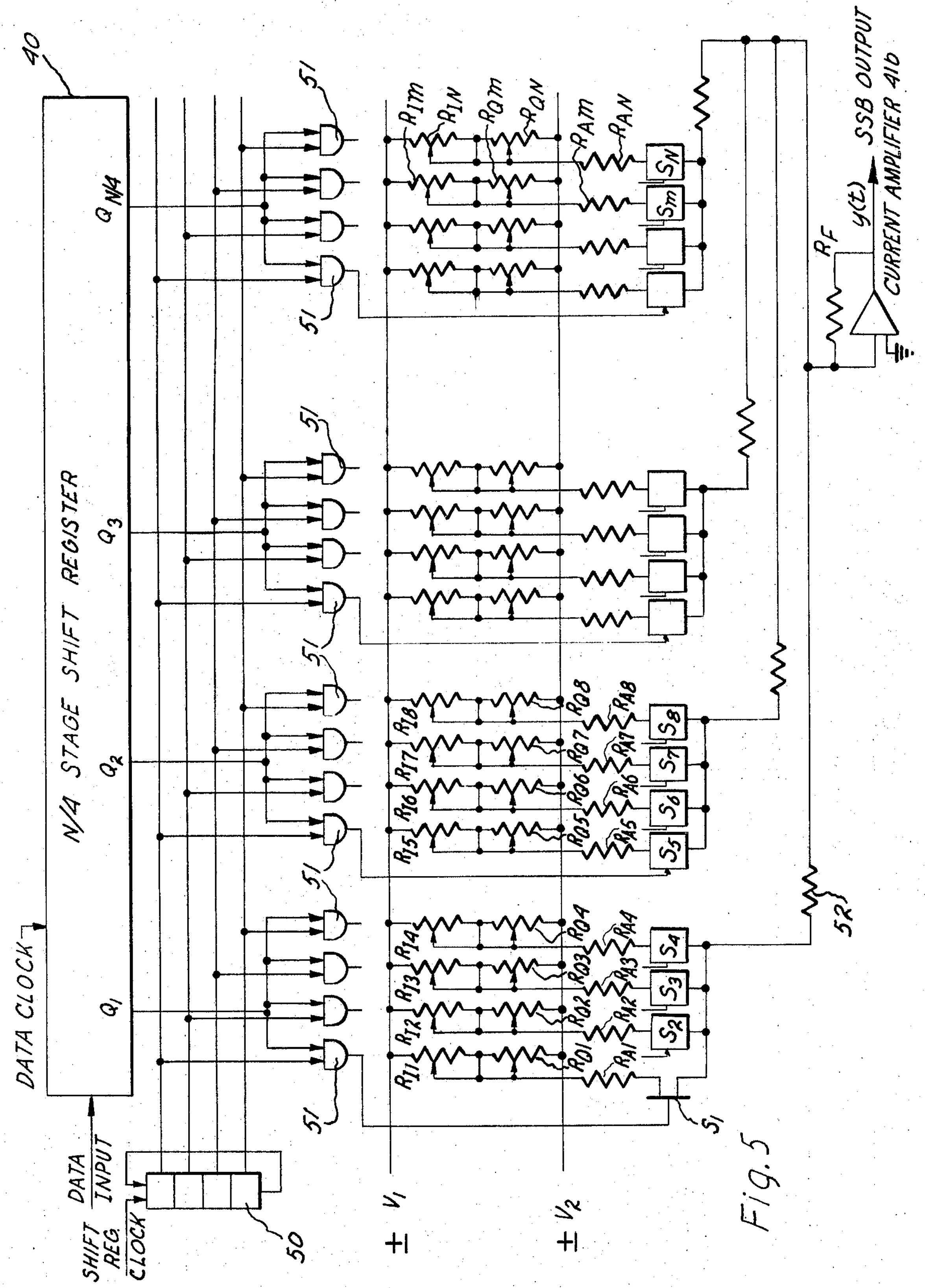
Figure 6:
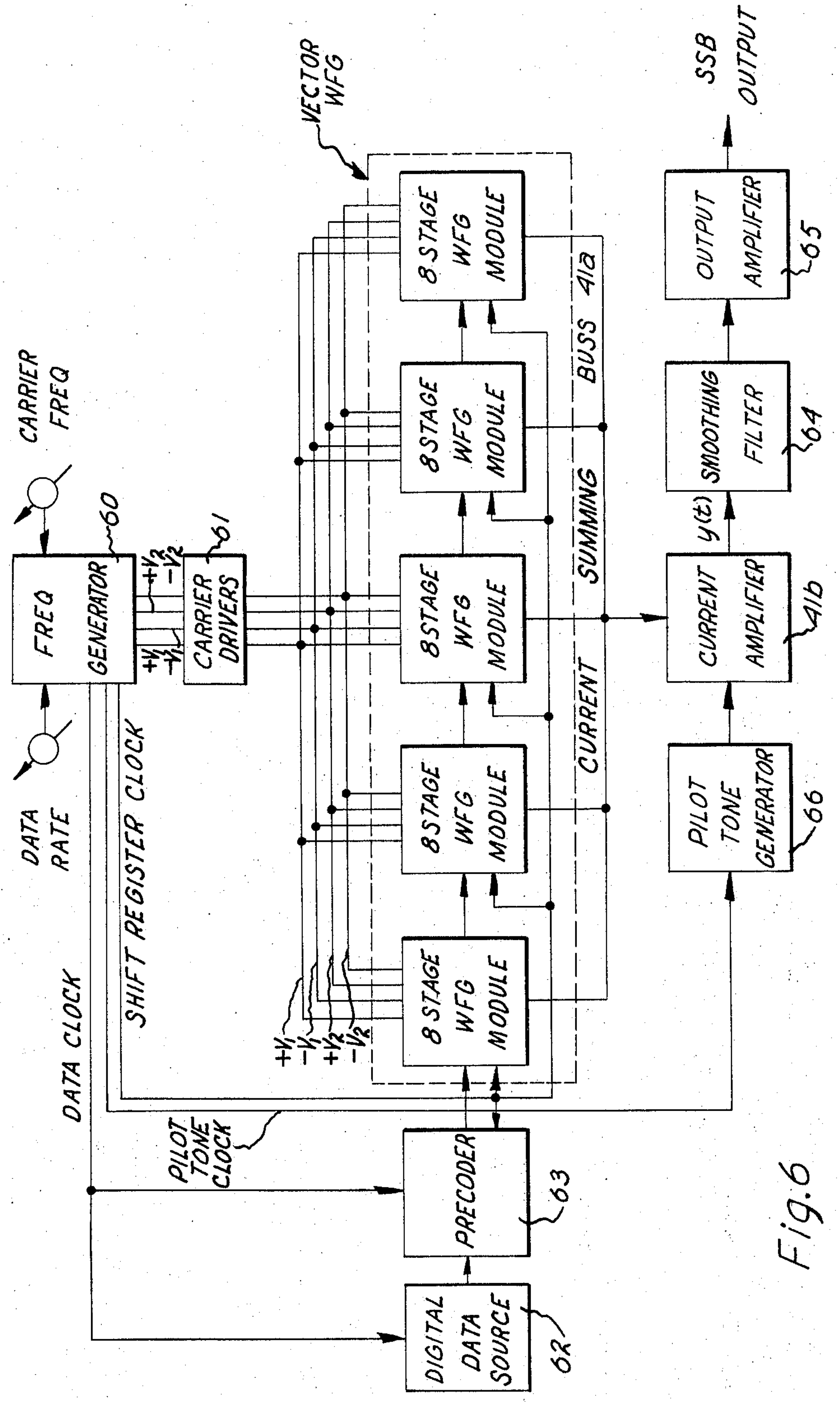

FIG. 5 is a second embodiment of my vector waveform generator utilizing a much shorter length shift register than in FIG. 4*a;* and FIG. 6 is a block diagram of the complete transmitter in accordance with my invention.

Figure 1:
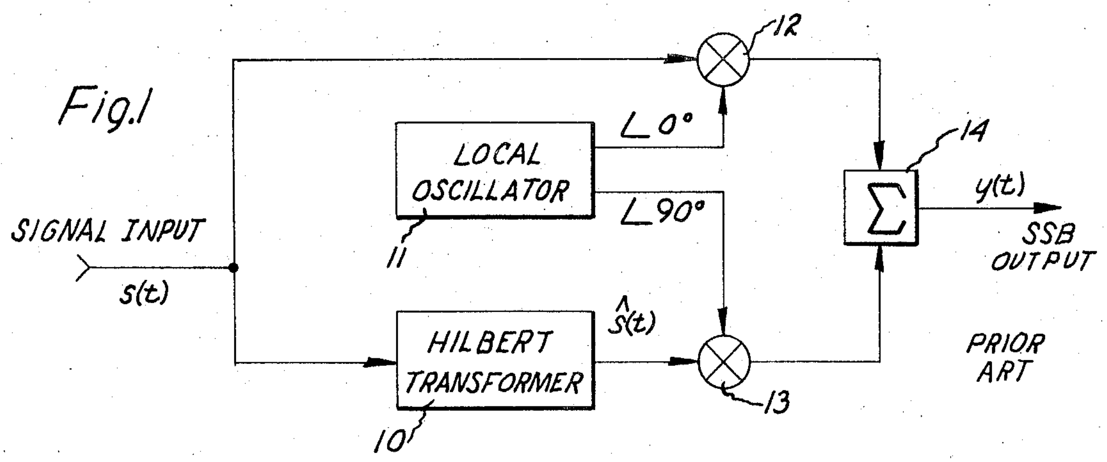
FIG. 1 is a general block diagram of a conventional SSB transmitter utilizing quadrature carrier phasing.

Referring now in particular to FIG. 1, it is well known that an amplitude modulated carrier function $y(t)$ can be expressed by the equation:

$$-y(t) = s(t)\cos\omega_c t \pm \tilde{s}(t)\sin\omega_c t \quad (1)$$

where $s(t)$ is the desired signaling waveform and $\omega_c$ is a fixed carrier frequency. $\tilde{s}(t)$ is the Hilbert transform of $s(t)$ for SSB modulation, and for DSB modulation, $s(t) = 0$. In the case of SSB modulation, the $\tilde{s}(t)$ sin term is positive for lower side band transmission, and negative for the upper. The above equation is conventionally implemented for SSB modulation by utilizing the FIG. 1 circuit wherein circuit 10 generates the Hilbert transform, $\hat{s}(t)$ of the signaling waveform $s(t)$ and a local oscillator 11 generates the in-phase (<0°) carrier function $\cos\omega_c t$ and a second carrier function $\sin\omega_c t$ of the same frequency but in quadrature (<90°) phase relationship therewith. A linear multiplier 12 forms the product of input signal $s(t)$ and in-phase carrier function $\cos\omega_c t$ and a second linear multiplier 13 forms the product of the Hilbert transform of the input signal, $\hat{s}(t)$, and the quadrature carrier function $\sin\omega_c t$. A summing amplifier 14 forms the sum of the two products to yield the signal $y(t)$ which is the single sideband (SSB) modulated output In the data transmission applications, the signal input $s(t)$ is a signaling waveform of predetermined shape occuring whenever it is desired to transmit information over a particular communication channel which, as a typical example, consists of a voice band telephone channel. In the early days of data transmission systems, the signaling waveform was derived by classical, lumped element filtering, but this approach is limited in its ability to accurately generate the desired waveform and also results in difficulty to realize a network that will accurately form the Hilbert transform of a voice bandwidth input signal. The earlier frequency domain approach, when applied to the present and anticipated future high data transmission rates would necessitate either a non-minimum phase structure or a filter and equalizer in order to meet the amplitude and phase characteristics required of such lumped element filtering.

As a result, attention is currently being directed toward time domain synthesis techniques whereby digital waveform generation may be utilized. Since the waveform is precisely known, the Hilbert transform may be calculated and digital waveform generators may be utilized to generate the desired waveform and the Hilbert transform of the desired waveform. The flexibility of digital waveform generation has the further advantage in that the signaling rate of such a waveform generator (and therefore the information bandwidth) may be changed to a desired value by simply changing the time base of the digital waveform generator whereas the frequency domain filter approach does not offer this flexibility.

Figure 2:
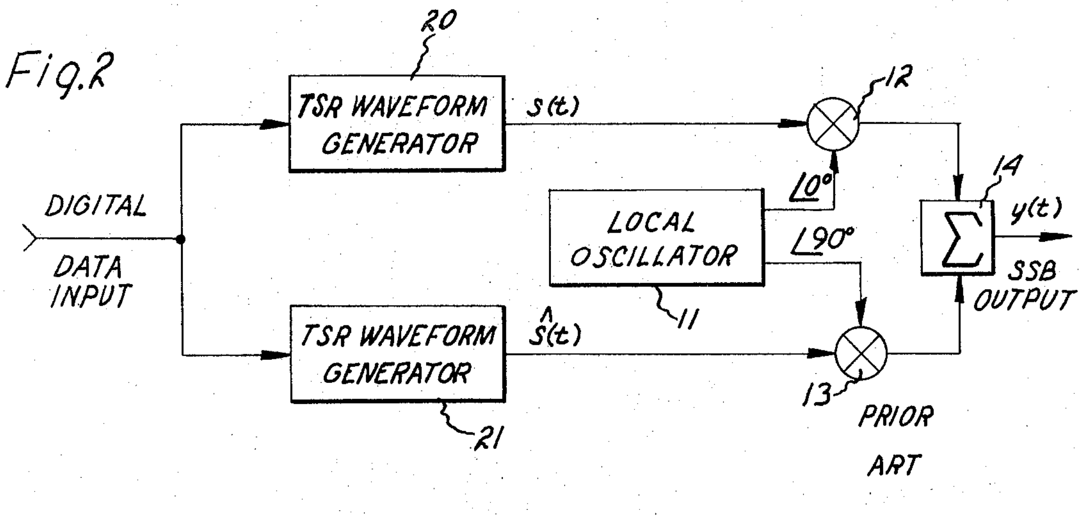
FIG. 2 is a general block diagram of a conventional SSB transmitter utilizing two tapped shift registers for signaling and Hilbert transform waveform generation.

One digital waveform generation technique known in the prior art requires the storage of samples of the desired waveform in binary form. Upon receipt of a data bit, the appropriate control logic sequentially reads out the stored data which is then converted from digital to analog via a D/A converter to thereby generate the waveform. A problem encountered with this approach is how to implement the superposition property that is required as a result of the signaling waveform extending over a number of signaling periods. Various approaches are feasible for implementing the superposition property. However, I have avoided the problem by selecting an alternative approach which is the tapped shift register (TSR) type of waveform generator since it provides the required superposition property, can take advantage of large scale integrated circuit technology, and provides increased flexibility by allowing the waveform to be changed by adjusting the tap weight values. A prior art system employing TSR time domain synthesis utilizing the quadrature phasing technique for SSB generation is illustrated in FIG. 2 wherein a first TSR waveform generator 20 generates a first base band waveform, the partial response signaling waveform $s(t)$, and a second TSR waveform generator 21 generates a second base band waveform which is the Hilbert transform $\hat{s}(t)$, of $s(t)$ in response to a digital data input. Local oscillator 11 is of the same type as in FIG. 1 for generating the in-phase and quadrature phase carrier functions, the outputs of the two TSR waveform generators being modulated onto the in-phase and quadrature carriers by means of linear multipliers 12 and 13, respectively. Oscillator circuit 11 also generates the shift register clock pulses. The modulated carriers are summed in summing amplifier 14 to provide at the output thereof the SSB modulated output $y(t)$.

The major disadvantages of the transmitter illustrated in FIG. 2 is the requirement for two TSR generators which thereby introduces more error sources as well as increasing the cost, and the use of two linear multipliers as the mixers which are analog rather than digital circuits. Although the linear multiplicity may be fabricated in integrated circuit form, it has finite accuracy specification thereby placing a performance limitation on the transmitter as well as being a severe burden if it is desired to incorporate the data transmitter as a single integrated circuit.

As a result of the limitations associated with the prior art transmitter discussed hereinabove, my invention is directed to eliminating the need for two TSR waveform generators and the need for any linear multipliers.

Referring now to FIG. 3, there is shown a general block diagram of a digitally implemented vector waveform SSB transmitter in accordance with my invention adapted for use in a high speed data transmission system. My transmitter is unique in that the waveform generation process yields the carrier function directly without requiring any additional modulation processes thereby avoiding the need for linear multipliers. The signaling waveform, $s(t)$, is of the class $I_V$ partial response type as one example of a waveform, and is a linear summation of weighted sin $x/x$ functions which has the advantage of containing no energy at D.C. and the capability to signal at the Nyquist rate. The transmitter includes a vector waveform generator circuit 31 that is used to simultaneously generate the signaling waveform, multiplied by an (in-phase) carrier function, and generate the Hilbert transform of the signaling waveform, multiplied by a quadrature carrier. The configuration of the transmitter is such that the two products are directly summed in the waveform generation process thereby yielding an output that is a single-side band function. Thus, my transmitter uses digital waveform generation techniques to simultaneously yield the desired signaling waveform and to perform the modulation process. All of the frequency functions generated in frequency source circuit 30, i.e., the data and shift register clocks, the carrier function and the quadrature carrier function are square waves (two level signals) so that no linear amplifiers or multipliers are required therein. The only linear components used in my transmitter are a current summing amplifier, an active filter for smoothing the staircase waveform obtained at the output of the summing amplifier, and an output amplifier to provide the required channel interface. The TSR waveform generator 31 which is the essence of my invention is more correctly described as a vector waveform generator as will be apparent from the discussion hereinafter.

Referring now to FIG. 4*a*, there is shown a general block diagram of the TSR waveform generator 31 illustrated in FIG. 3 which includes an N stage shift register 40 of conventional design provided with a clock input for determining the shift register's shift rate, a data input and an N plurality of outputs designated $Q_1$, $Q_2$, - - -$Q_m$, $Q_N$. The variable tap weights associated with corresponding shift register outputs are designated $C_1$, $C_2$ - - -$C_m$, $C_N$ and a suitable summing means 41 is coupled to the outputs of the tap weights for summing the signal samples derived from each shift register output and associated tap weight. The output of the summing means 41 would appear to be the desired signaling waveform $s(t)$ having a waveform established by the predetermined values of the tap weights, but in reality the signaling waveform generation process is simultaneously combined with the Hilbert function generation process and carrier function multiplication process in the TSR waveform generator to yield the SSB output function $y(t)$ at the output of summer 41 as will be described hereinafter. The relationship between the input data pulse and the shift register clock is preferably established such that an integer relationship exists between the clock rate and the data rate. Although such integer relationship is not a requirement, it simplifies the calculations of the tap weights. It will be assumed that the input data to the shift register 40 is constrained such that a single logic 1 is entered into the shift register for each input data pulse regardless of the shift register's clock rate. Under this assumption, a desired signaling waveform in SSB modulated form is produced that is a continuous train of equal duration pulses whose duration is fixed by the clock rate, and the amplitude and polarity is determined by the tap weight circuitry. An example of a time domain plot of a typical signaling waveform $s(t)$ generated in my vector waveform generator as it appears following demodulation (in a receiver) is illustrated in FIG. 4b. Signaling waveform $s(t)$ is thus seen to be a staircase approximation of the desired smooth waveform due to the digital incremental generation thereof. Each signal sample in this staircase waveform has a duration $\Delta$ equal to a clock period, i.e., 1/shift register clock frequency. Due to the average values of the positive and negative polarity samples in the illustrated waveform $s(t)$ being equal, such waveform contains no energy at D.C. and thereby results in the desired SSB suppressed carrier (SSBSC) output.

Referring now to FIG. 4*c* there is shown in schematic form a simplified representation of the tap weight circuitry indicated generally by $C_1$, $C_2$ - - -$C_N$ in FIG. 4*a*. FIG. 4*c* is thus a simplified schematic diagram of the vector waveform generator which forms the primary component of my invention. My vector wavefor generator uses time domain waveform generation to implement equation (1) and thereby generate an SSB output $y(t)$ in response to a single data sample entering the shift register. As stated hereinabove, the output $y(t)$ is a staircase approximation of a desired signaling waveform, $s(t)$, in SSB modulated form and consists of a contiguous train of pulses each of whose duration is fixed by the clock rate and the amplitude (and polarity) is established by a particular tap weight circuit. Each tap weight circuit includes a pair of resistors $R_I$ and $R_Q$ serially connected across voltage lines designated $\pm V_1$ and $\pm V_2$. Voltage $\pm V_1$ represents the in-phase carrier function generated in frequency source 30 (in FIG. 3) and $\pm V_2$ represents the quadrature carrier function. For purposes of simplification, voltage lines $\pm V_1$ and $\pm V_2$ are indicated as single lines although, as illustrated in the more detailed schematic diagram of FIG. 4*d*, voltages $V_1$ and $V_2$ also include 180° phase displaced components on two additional lines. Each pair of serially connected resistors $R_I$, $R_Q$ is associated with a particular shift register stage output. Thus, resistors $R_{I1}$, $R_{Q1}$ are serially connected across voltage lines $V_1$, $V_2$ and are associated with the first shift register stage output $Q_1$. In like manner, resistors $R_{I2}$, $R_{Q2}$ are serially connected across voltage lines $V_1$ and $V_2$ and associated with the second stage output $Q_2$ and so on to the resistors $R_{IN}$, $R_{QN}$ connected across lines $V_1$ and $V_2$ and associated with the Nth stage output $Q_N$. Each pair of these serially connected resistors $R_I$, $R_Q$ is provided with a tap point which is connected through a suitable switching means, S, operated by the shift register output, and a third resistor $R_A$ to a current summing bus 41*a* that provides an input to a current summing amplifier 41*b*. Current summing bus 41a and current summing amplifier 41*b* thus form the summing means 41 indicated in FIG. 4*a*. The third resistors are designated $R_{A1}$, $R_{A2}$ - - -$R_{Am}$, $R_{AN}$ and it is evident that a sequential operation of the switching means $S_I$, $S_2$, - - -$S_m$, $S_N$ completes the electrical circuits from the tap points of the pairs of resistors $R_I$, $R_Q$ through the associated third resistor $R_A$ to the current summing bus to thereby generate sequential carrier current signal samples constituting the contiguous pulses of the staircase approximation of the signaling waveform $s(t)$ in SSB modulated form. The switching devices $S_1$ through $S_N$ are preferably fast response integrated circuit devices such as MOSFETS having the gate electrodes thereof connected to the shift register outputs. It is thus seen that the train of contiguous pulses sequentially produced at the outputs of the shift register in response to a single data sample input determine the sequence and time periods of the closed states of switches $S_1$ through $S_N$ wherein such time periods are 1/shift register clock rate.

The amplitude of the carrier current signal samples which are digitally generated in my vector waveform generator are readily seen to be established by the combination of the carrier function voltages $V_1$, $V_2$ and resistors $R_{Ij}$, $R_{Qj}$ and the ratio of $R_F$ to $R_{Aj}$ wherein j subscript denotes the jth tap and $R_F$ is the amplifier 41b feedback resistor. The exact amplitude may be calculated by first using Thevinin's Theorem to replace the carrier function voltage sources $V_1$ and $V_2$ and the resistances $R_{Ij}$ and $R_{Qj}$ by an equivalent voltage source $V_j$ and source resistance $R_j$ wherein the voltage source $V_j = V_1(1-a_j) + V_2 a_j$ and the source resistance $R_j = a_j(1-a_j)R$ where $a_j = R_{Ij}/R$ and $R = R_{Ij} + R_{Qj}$. As a result, the voltage output of the current amplifier 41*b* when the shift register output ($Q_j$) is at a logic 1 is:

$$V_{oj} = A_{vj}\,(V_1(1-a_j) + V_2 a_j) \text{ where } A_{vj} = R_F/(R_j + R_{Aj}) \qquad (2)$$

Summing the responses due to all N stages yields the total response to a single data input pulse as being:

$$y(t) = \sum_{j=1}^{N} p(t-jT)\cdot A_{vj}\{V_1(1-a_j) + V_2 a_j\} \qquad (3)$$

where $p(t) = 1, |t| < T/2$ $= 0$ otherwise

Equation (3) can be rewritten in the form:

$$y(t) = V_1 \cdot I(t) + V_2 \cdot Q(t) \quad (4)$$

where:

$$I(t) = \sum_{j=1}^{N} p(t-jT) A_{vj}(1-a_j) \quad (5)$$

and $$Q(t) = \sum_{j=1}^{N} p(t-jT) A_{vj} a_j \quad (6)$$

$I(t)$ may be identified as a staircase approximation to the desired signaling waveform, $s(t)$, and $Q(t)$ may be adjusted by means of selecting $A_j$ and $a_j$, to be its Hilbert transform, $\hat{s}(t)$. Therefore, if $V_1$ is set equal to $+\cos\omega_c t$ and $V_2$ is set equal to $+\sin\omega_c t$, it is evident that the output of current summing amplifier 41$b$, $y(t)$, is the lower side band SSB function as defined by equation (1). Setting $V_2$ equal to $-\sin\omega_c t$ obtains the upper side band SSB function.

The expression "vector waveform generator" is used to describe the waveform generation process in my invention for the following reasons. From the hereinabove described circuit resulting from Thevinin's Theorem, it is apparent that the equivalent voltage generator $V_j$ is the weighted sum of carrier function voltages $V_1$ and $V_2$, and since these two voltages are orthogonal functions, i.e., sine and cosine, the weighted sum may be viewed as a vector rotation or phasing of the carrier $\omega_c$. The vector rotation or phasing of the resultant carrier voltage signal at each tap point can be controlled over the entire 360° by proper selection of the polarity of the in-phase, $V_1$ and 90° out-of-phase carrier function $V_2$. The current that is directed to the summing bus 41$a$ is a function of the equivalent voltage source $V_j$, source resistance $R_j$ and resistor $R_{Aj}$ with reference to the $j$th tap. Hence, $R_{Aj}$, the third resistor connected to the tap point by means of the shift register actuated switch, $S_j$, may be interpreted as a scaling function that serves to provide the phased carrier with amplitude weighting. Thus, the combination of the phasing derived by the action of resistors $R_{Ij}$ and $R_{Qj}$ coupled with the amplitude scaling imparted by resistor $R_{Aj}$ leads to the name of vector waveform generator, and it is seen that the sequentially completed electrical circuits caused by the sequentially closed states of switches $S_1$ through $S_N$ thus determine the sequence and time periods of the closed states thereof and thereby result in amplitude weighting of the resultant sequentially generated phase controlled carrier current signal samples which form signaling waveform $s(t)$ in SSB modulated form.

In order to meet one of the objects of my invention, that of providing the transmitter with capability for being manufactured by integrated circuit technology for mounting on a single integrated circuit chip, the preferred method of realizing the SSB function $y(t)$ is somewhat different from that described hereinabove in that square waves are utilized rather than sinusoids for the carrier function voltages $V_1$ and $V_2$ thereby permitting the use of a switching, rather than linear, driver (amplifier) in the carrier drivers 61 shown in FIG. 6. Since square waves are a linear summation or superposition of weighted sinusoids of the form $\cos\omega_c t$, $\cos 3\omega_c t$, etc. and $\sin\omega_c t$, $\sin 3\omega_c t$, etc., it is seen that the resulting output function is still the desired SSB function. The additional spectral distributions, due to pairs of terms such as $\cos 3\omega_c t$ and $\sin 3\omega_c t$ give rise to SSB functions which are well out of the channel pass band so that they can be ignored.

The design of the SSB waveform generator requires that the values of $a_j$ and $A_{vj}$ be established. It can be shown that, if the desired sample amplitudes for $I(t)$, $Q(t)$ are $I_j$ and $Q_j$, the required values for $a_j$ and $A_{vj}$ are given by:

$$a_j = 1/(l+I_j/a_j)$$

$$A_{vj} = Q_j/a_j$$

Once knowing $a_j$ and $A_{vj}$, it is a simple matter to calculate the equivalent source resistance $R_j$ and, knowing the summing current amplifier feedback resistor $R_F$, to determine the required value for $R_{Aj}$.

The vector waveform generator, in accordance with my invention, is extremely versatile in that the specific SSB waveform generator illustrated hereinabove can be generalized to provide other type outputs. Thus, by setting the quadrature carrier function voltage $V_2 = 0$ (i.e., ground potential) and in-phase carrier voltage $V_1$ to a D.C. reference level (of both + and − polarity), the generator operates as a tapped shift register base band waveform generator. Simple logic circuits can be used to inhibit the carrier drivers, described with reference to FIG. 6, and thereby yield the required d.c. level. Similarly, setting carrier voltage $V_2 = 0$ and $V_1 = \pm\cos\omega_c t$, obtains a double side band suppressed carrier (DSBSC) transmitter. This versatility is useful in applications where it is desired to implement a dual modulation mode transmitter which uses DSBSC to send information at a reduced rate over a very poor channel that will not support the high speed SSB transmission. The suppressed carrier mode of the DSBSC transmission is obtained by selection of the resistor weight matrix, $R_I$, $R_Q$, $R_A$ to assure that the average values of the positive and negative polarity samples in signaling waveform $s(t)$ are equal. If the resistances are chosen to obtain unequal average values, there is a resultant D.C. energy and the carrier is not suppressed. Either (upper or lower) single side band (by merely logically inverting the quadrature carrier function) or vestigal side band modulation can be obtained with my vector waveform generator by using both carriers, and correctly adjusting the resistor weighting matrix.

Because of the above capabilities, my vector waveform generator may be viewed as a generalized pulse-amplitude-modulated (PAM) transmitter which requires four carrier function voltages for SSB modulation and only three carrier function voltages (one being $V_2 = 0$) for base band and DSBSC transmission. Obviously, each pair of 180° phase related carrier function voltages can also be provided from a single carrier function voltage source by employing an inverter for obtaining the 180° phase reversal. Also, my invention is not limited to the partial response waveforms and therefore can include single polarity signaling waveforms which, of course, contain energy at D.C. and therefore cannot provide a suppressed carrier mode of transmission over the communication channel. In the latter case, only two carrier function voltages would be necessary, $V_1$ being a single polarity voltage and $V_2 = 0$. Since the only filter in the transmitter is used for smoothing the staircase waveform as described with reference to FIG. 6, the carrier frequency (and the modulation format) can be changed during system operation, if desired. Thus, the transmitter can be operated as a 4,800 bit per second (bps) SSB transmitter with a 3 KHz carrier and the operation subsequently switched for use as a 2,400 bps DSB transmitter with an 1,800 Hz carrier over a back-up channel.

Referring now to FIG. 4*d*, there is shown a more detailed diagram of the vector waveform generator illustrated in FIG. 4*a*, and in particular, illustrates the four carrier function busses which are supplied with carrier function voltages $\pm V_1$ and $\pm V_2$ for obtaining SSB modulation. The use of these four carrier function voltages, which are of equal frequency square waveform displaced from each other in multiples of 90°, as illustrated, enables the resistive summing or weighting at the tap point to realize the 360° phase rotation. Jumper wires, or other suitable means, are used to connect the $R_I$, $R_Q$ resistors to the selected pair of carrier busses for obtaining the desired signaling waveform $s(t)$. In one embodiment of my vector waveform generator, constructed with five modules as shown in FIG. 6, each module contains eight stages and FIG. 4d therefore illustrates one of such five modules. The switching devices $S_1$, - - -$S_8$ for connecting the tap points of the $R_I$ and $R_Q$ resistors to the current summing bus through the amplitude weighting resistor $R_A$ are MOSFETs operated as switches thereby permitting bipolarity current flow therethrough in accordance with the particular bipolarity of the carrier current signal sample generated in a particular resistor-voltage network. Although the shift register 40 may be implemented using logic which is not directly compatible with the drive requirements of the switching field effect transistors, and suitable level translators would then be required, it is preferred to implement the shift register with MOS logic with levels directly compatible with the drive requirements of the switching devices when implemented using MOSFET switches. Also, although the $R_I$, $R_Q$, and $R_A$ resistors can each be of fixed resistance value, one can utilize individually adjustable resistors to have a greater versatility in the control of the phase and amplitude relationships for each discrete carrier current signal sample. As stated hereinabove, an integer relationship between the clock rate and data rate is preferably utilized for simplification and calculation of the values of the various constants and, as a typical example, the shift register clock may be set equal to four times the data clock rate. The output of the eighth stage ($Q_8$) of the eight stage module illustrated in FIG. 4d is also connected to the data input of the eight stage shift register immediately connected thereto.

Referring now to FIG. 5, there is shown a second embodiment of my vector waveform generator which utilizes a shift register that is only 1/4 the length (N/4) of the shift register depicted in FIGS. 4*a* through 4*d*. The obvious advantage in utilizing shorter length shift registers is reduced cost and reduced area required on the integrated circuit chip when integrating the transmitter on a single chip. The vector waveform generator depicted in FIG. 5 is best compared with the generator depicted in FIG. 4*b* for purposes of noting the distinguishing features between the two embodiments. The most important feature is that the FIG. 5 shift register is of shorter length than the shift register in FIG. 4*d*. Thus, the 40 bit shift register (5 modules having eight stages per module) exemplified with reference to the FIG. 4*d* (and 6) embodiment would become a shift register of length $40/x$ where $x$ is an integer and represents the ratio of shift register to data clock speeds. As a typical example, the shift register clock is four times the data clock and the shift register in the FIG. 5 embodiment therefore becomes a ten stage register corresponding to the forty stage register in FIG. 4*d*. In the FIG. 4*d* embodiment, the number of shift register stages is determined by both the number of data periods (10) of the signaling waveform and the sampling rate, number of samples per data period (4), whereas in FIG. 5 the number of stages is solely a function of the number of data periods and therefore the clock input to the shift register is the data clock rate therein. In order to implement the second embodiment of my vector waveform generator, each shift register output is connected to $x$ (number of samples per data period) logic circuits which are sequentially addressed to provide the desired sequential output corresponding to the sequential output in the N stage shift register of FIG. 4*d*. A means for cycling the four logic circuits connected to each output of the shift register must be provided, and a suitable conventional means is a four stage ring counter 50 having its input supplied from the data clock. The logic circuitry connected to the output of each shift register stage consists of four AND gates, as one example, each having one input connected in common to the same shift register output and second inputs connected respectively to the four outputs of the ring counter. Thus, as a data signal proceeds through the shift register, during its temporary presence at each shift register output, the four AND gates 51 associated therewith are addressed in sequence by the ring counter and the output of each group of four AND gates provides the same sequential operation of the FET switches $S_1$ - - -$S_N$ as in the FIG. 4*c* embodiment. The final distinction between the FIGS. 5 and 4*c* embodiments is the splitting up of the amplitude weighting resistors $R_A$ into two separate resistors with one of the resistors being common to each group of four resistor networks associated with a single shift register output. Thus, a common resistor 52 is connected between the common output electrodes of each group of four associated switching transistors and the input of current summing amplifier 41*b*, and trimming resistors $R_{A1}$ through $R_{A4}$ are connected between the tap points of the associated $R_I$ and $R_Q$ resistors and the input electrodes of the switching transistors $S_1$ thru $S_4$. This permits the use of smaller resistor value resistors $R_{A1}$ to $R_{AN}$. For many applications, resistors 52 may be of fixed resistance and the trimmer resistors are made variable to obtain the versatility of changing the amplitude weighting of the carrier current signal samples when it is anticipated that the signaling waveform will be changed during operation of the transmitter. In other respects, the FIG. 5 embodiment of my vector waveform generator is the same as that illustrated and described with reference to FIGS. 4*c* and 4*d*.

Referring now to FIG. 6, there is shown a block diagram of the complete transmitter utilizing my vector waveform generator including the five interconnected modules each consisting of an eight stage shift register. The five, eight-stage modules were utilized for convenience of packaging since they are commercially available, and obviously this is no restriction on the manner of implementing a 40 stage (or other number stage)

shift register. Thus, each of the modules depicted in FIG. 4d is designated as an "8 stage WFG module" in FIG. 6 and the five modules are enclosed in dashed outline. A frequency generator 60 generates the shift register clock and data clock frequencies, as well as the ± in-phase and ± quadrature carrier frequency signals designated $\pm V_1$ and $\pm V_2$. As stated hereinabove, the second polarity components of the $V_1$ and $V_2$ carrier function voltages need not be generated within generator 60, and can be achieved by utilizing conventional logic elements for producing the 180° phase reversals (polarity sign inversions). In general, the ratio of the shift register clock frequency to the data clock frequency is maintained constant and various data clock and carrier frequencies are switch selectable from the front panel of the transmitter. As a typical example, frequency generator 60 was designed to provide five possible data rates ranging from 1,200 to 4,800 bps and five corresponding carrier frequencies ranging from 2 to 3 kHz. The carrier frequency is independent of the data rate and is selected to position the transmitted signal $y(t)$ in the center of the communication channel's response. The only relationship that exists with respect to the carrier frequency and data rate is the restriction that the carrier frequency be high enough to prevent the modulation from being attenuated by the low frequency cut-off of the communication channel. Frequency generator 60 includes an oscillator, counters and suitable control logic for providing required count-down functions thereby deriving the multiple data and carrier frequencies and the shift register clock frequency. As one example, frequency generator 60 may be a conventional crystal oscillator (basic oscillator frequency of 288 kHz) driving two modulo N count-down chains wherein the values of N are selected by the front panel switches to establish the desired values of data rate (1,200 to 4,800 bps) and carrier frequency (2 to 3 kHz). The count-down chain which develops the data clock signal also develops the shift register clock signal since it is four times higher in the illustrated example. The four 90° phase-displaced square wave carrier function voltages ($\pm V_1$, $\pm V_2$) are developed from the output of the second count-down chain by means of a conventional logic circuit consisting of two AND gates and two flip-flops. Four suitable power (i.e., driver) amplifiers 61 are connected between the carrier outputs of frequency generator 60 and the corresponding $\pm V_1$ and $\pm V_2$ carrier frequency voltage busses. The carrier drivers 61 are conventional saturated transistor switches capable of supplying the required electric current to the waveform generator $\pm V_1$ and $\pm V_2$ carrier lines.

A digital data source 62 timed by the data clock frequency provides the digital data signals into the transmitter. Digital data source 62 can be any source of digital information desired to be transmitted such as a computer or the output of an analog-to-digital converter as two examples. A data precoder 63 also timed by the data clock is connected from the output of digital data source 62 to the data input of the first eight stage module in the vector waveform generator. The partial response signaling waveform which is generated by my vector waveform generator belongs to a class of waveforms that are termed "correlation coded waveforms" because a known amount of correlation or redundancy is inserted into the waveform in order to attain a particular performance characteristic such as spectral shaping. The effect of this correlation, so far as the communication system receiver is concerned, is that it makes the data recovery process dependent on past decisions unless the data is pre-coded in the transmitter prior to transmission. The data pre-coder 63 is a conventional digital logic circuit consisting of a two stage shift register and exclusive OR which provides the required precoding so that the decisions made by the receiver are independent of past data history and pre-coder 63 also includes an interface logic circuit timed by the shift register clock which insures that a single logic one is entered into the shift register for each coded data bit, even though the duration of the data bit is four times that of the shift register clock (for the case of the shift register clock being four times the data clock frequency). Digital data source 62 produces output digital signals which have logic levels compatible with precoder 63.

The signaling waveform $s(t)$ in modulated form generated within the vector waveform generator is a stepped approximation to the desired modulated signal so that its spectrum is similar to that of a sampled-data signal. Although the sampling rate is sufficiently high to permit the response of the communication channel to be used as the band limiting or smoothing filter, a separate smoothing filter 64 is preferably provided in the transmitter and connected to the output of summing current amplifier 41*b*. In the case of the communication channel being a telephone channel, smoothing filter 64 removes any possible interference problems from arising in the local telephone plant equipment as a result of the high frequency energy generated in the transmitter. Filter 64 is of the conventional active, low-pass type and as one typical example can be a third order linear phase (Paynter) filter to thereby band-limit the modulated output waveform to the channel bandwidth.

The output of smoothing filter 64 is connected to the input of a power amplifier 65 which functions as the output amplifier of the transmitter and, in the case of the communication channel being a telephone line, is designated as a line driver. The amplifier 65 is a conventional integrated circuit and its output is transformer coupled with the required resistance to match the communication channel termination impedance.

The receiver in my data communication system may use a low frequency pilot tone for a carrier recovery process adapted to monitor the phase jitter and frequency offset characteristics of the communication channel. In order to obtain this pilot tone which, in the case of a 3 kHz carrier frequency, is a frequency of 400 Hz as a typical example, the pilot tone generator 66 generates a sampled data approximation to a sinusoidal waveform whose sampling rate is an integer number times the pilot tone frequency in order to provide a single spectral component within the passband of the channel. The pilot tone clock frequency input to pilot tone generator 66 is supplied from frequency generator source 60. The pilot tone generator output is summed with the vector waveform generator output in current amplifier 41*b* and smoothed by means of the same filter 64.

In view of the foregoing description, it is apparent that the objects of my invention have been attained. In particular, I have provided a data communication transmitter which utilizes my novel vector waveform generator of relatively simple design and correspondingly low cost for simultaneously generating at the carrier frequency a desired signaling waveform and performing a desired modulation process in response to a single data input. The transmitter is provided with multi-speed data transmission capability in that the data rate (data clock frequency) is adjustable in frequency generator 60 and the proper selection of the carrier frequency and data clock frequency permits data transmission at the Nyquist rate. A Nyquist rate of transmission of 4,800 bps over a voice band telephone channel having a nominal usable bandwidth of 2,400 Hz was achieved with my system. My use of only a single waveform generator and not requiring any linear amplifiers or multipliers in the signal generation process other than the current summing amplifier 41*b* readily adapts my transmitter for manufacture by integrated circuit technology that permits fabrication of such transmitter, except for the amplifier 41b, filter 64 and output amplifier 65 as a single integrated circuit. My transmitter also has the advantage of being readily converted (switch selectable) from an SSB transmitter to a DSBSC or base band transmitter. In the case of an SSB modulation transmitter, the modulation format is of the SSB type wherein either the lower or upper side band can be transmitted by simple switch selection. Finally, my waveform generator is not restricted to the generation of partial response signaling waveforms, and requires a minimum of two carrier function voltages, one of which may be zero volts.

Having described two embodiments of my vector waveform generator, is is believed obvious that modification and variation of my invention is possible in light of the above teachings. Thus, various of my disclosed logic circuits, such as the ring counter for cycling the AND gates in FIG. 5, may be replaced by equivalent conventional circuits, a pair of interconnected flip-flops performing the ring counter cycling function for the case wherein a 4-stage ring counter is employed. Also, the component 40 need not be limited to a shift register and can be any digital control means having the capability of storing data information (a digital memory) for obtaining superposition of the resultant signaling waveform. Finally, if single chip fabrication of the vector waveform generator is not a consideration, carrier functions $V_1$ and $V_2$ can be sinusoids in accordance with equation (1). It is, therefore, to be understood that changes may be made in the particular embodiments described which are within the full intended scope of my invention as defined by the following claims.

What is claimed is:

1. A data communication transmitter utilizing a vector waveform generator for simultaneously generating a desired signaling waveform and performing a desired modulation process for transmission over a communication channel in response to a data signal input and comprising frequency source means for generating a data clock signal, a carrier frequency signal and a shift register clock signal, the carrier signal having four components consisting of a first carrier function voltage, a second carrier function voltage of the same frequency as the first carrier function voltage and in quadrature phase relationship therewith, a third carrier function voltage of the same frequency as the first carrier function voltage and in 180° phase relationship therewith, and a fourth carrier function voltage of the same frequency as the second carrier function voltage and in 180° phase relationship therewith, vector waveform generating means comprising electrical conductor means selectively supplied with said four voltage components of the carrier signal, a plurality of first resistor means each connected across a pair of said electrical conductor means, each first resistor means provided with a tap point at which is developed a weighted sum of the selected voltage components of the carrier signal thereby providing a controlled phasing or vector rotation of the resultant carrier frequency voltage signal, a like plurality of second resistor means having first ends thereof adapted to be sequentially electrically connected to the tap points of associated said first resistor means and having second ends connected to a current summing means, digital control means for producing a train of contiguous equal duration pulses in response to a single data signal applied to a data signal input of said digital control means, the duration of each pulse determined by the frequency of the clock signal applied to a clock input of said digital control means, a like plurality of switch means operatively responsive to outputs of said digital control means for sequentially electrically connecting the first end of each of said second resistor means to the tap point of the associated first resistor means, the train of contiguous pulses determining the sequence and equal time periods of the nonoverlapping closed and resistor connecting states of said switch means thereby providing amplitude weighting of a like plurality of resultant sequentially generated phase controlled carrier current signal samples forming a desired signaling waveform in modulated form, and current summing means connected to the second ends of said second resistor means for summing the sequentially generated amplitude and phase controlled carrier current signal samples for transmission over a communication channel in response to the single data signal applied to the data signal input of said digital control means.

2. The data communication transmitter set forth in claim 1 wherein said frequency source means comprises an oscillator an digital logic means connected to an output of said oscillator for deriving the data clock, carrier frequency and shift register clock signals in digital form, the first carrier function voltage is a first waveform of a square wave type, the second carrier function voltage is a second square wave of the same frequency as the first square wave and in 90° phase lagging relationship therewith, the third carier function voltage is a third square wave of the same frequency as the first square wave and in 180° phase relationship therewith, and the fourth carrier function voltage is a fourth square wave of the same frequency as the first square wave and in 270° phase lagging relationship therewith.

3. The data communication transmitter set forth in claim 1 wherein said frequency source means comprises an oscillator for generating sinusoidal shape waveforms, the first carrier function voltage is a first sinuosidal wave cos $\omega_c t$, the second carrier function voltage is a second sinusoidal wave sin $\omega_c t$, the third carrier function voltage is a third sinusoidal wave -cos $\omega_c t$, and the fourth carrier function voltage is a fourth sinusoidal wave - sin $\omega t$.

4. The data communication transmitter set forth in claim 1 wherein said electrical conductor means consists of four electrical conductors respectively supplied with the four carrier function voltages to thereby produce the desired signal waveform in single side band modulated form at the output of the transmitter wherein the lower side band is transmitted.

5. The data communication transmitter set forth in claim 4 wherein the carrier function voltages supplied to the second and fourth of said four conductors are reversed in order to thereby produce the desired signaling waveform in single side band modulated form at the transmitter output wherein the upper side band is transmitted.

6. The data communication transmitter set forth in claim 4 wherein first ends of said first resistor means are connected selectively to the two electrical conductors supplied with the first and third carrier function voltages, second ends of said first resistor means connected selectively to the two other electrical conductors supplied with the second and fourth carrier function voltages for developing at the tap points the phase controlled resultant carrier voltage signal which is phase controllable over the entire 360° in accordance with the selection of the carrier function voltages supplied to the four electrical conductors.

7. The data communication transmitter set forth in claim 1 wherein said digital control means is a multi-stage shift register having a like plurality of outputs connected to said switch means whereby the train of contiguous pulses appearing sequentially at the shift register outputs determine the sequence and time periods of the closed states of said switch means, the clock input of said shift register supplied with the shift register clock signal.

8. The data communication transmitter set forth in claim 7 wherein said switch means are switching transistors having gate electrodes connected respectively to the outputs of said multi-stage shift register.

9. The data communication transmitter set forth in claim 8 wherein said switching transistors are of the MOSFET type.

10. The data communication transmitter set forth in claim 1 wherein said digital control means is a multi-stage shift register having a plurality of outputs of number equal to the plurality of said switch means divided by an integer which represents the ratio of shift register to data clock frequencies, the clock input of said shift register supplied with the data clock signal, a plurality of logic AND gates of number equal to the plurality of said switch means and arrange in groups of the number corresponding to the ratio of shift register to data clock frequencies, the groups of AND gates having first inputs respectively connected to the outputs of said shift register whereby each group has its first inputs connected to a common shift register output and having second inputs sequentially addressed to provide the desired sequential operation of said switch means, and digital clock means having an input supplied with the shift register clock signal for cycling at the shift register clock frequency a single output pulse at a plurality of outputs thereof of number equal to the ratio of shift register to data clock frequencies, outputs of said cycling means connected respectively to the second inputs of said AND gates in each group thereof, output of said AND gates connected respectively to said switch means whereby simultaneous inputs to one of said AND gates in a group thereof from an associated shift register output and cycling means output determines the particular switch means in each group of switch means associated with the corresponding group of AND gates which will be operatively responsive for electrically connecting the first end of a particular one of said second resistor means to the tap point of the associated first resistor means.

11. A data communication transmitter utilizing a vector waveform generator for simultaneously generating a desired signaling waveform and performing a desired modulation process for transmission over a communication channel in response to a data signal input and comprising frequency source means for generating a data clock signal, a carrier frequency signal and a shift register clock signal, the carrier signal having three voltage components consisting of first and second carrier function voltages respectively consisting of a positive and negative D.C. reference voltage and a third component being zero volts, vector waveform generating means comprising three electrical conductors respectively supplied with the three voltage components of the carrier signal, a plurality of first resistor means having first ends connected selectively to the two electrical conductors supplied with the first and second carrier function voltages, second ends of said first resistor means connected to the third electrical conductor supplied with the third component of zero volts, each first resistor means provided with a tap point at which is developed a weighted sum of the selected voltage components of the carrier signal thereby providing a controlled phasing or vector rotation of the resultant carrier frequency voltage signal, a like plurality of second resistor means having ends thereof adapted to be sequentially electrically connected to the tap points of associated said first resistor means and having second ends connected to a current summing means, digital control means for producing a train of contiguous equal duration pulses in response to a single data signal applied to a data signal input of said digital control means, the duration of each pulse determined by the frequency of the clock signal supplied to a clock input of said digital control means, a like plurality of switch means operatively responsive to outputs of said digital control means for sequentially electrically connecting the first end of each of said second resistor means to the tap point of the associated first resistor means, the train of contiguous pulses determining the sequence and equal time periods of the nonoverlapping closed and resistor connecting states of said switch means thereby providing amplitude weighting of a like plurality of resultant sequentially generated phase controlled carrier current signal samples forming a desired signaling waveform in baseband form at the output of the transmitter, and current summing means connected to the second ends of said second resistor means for summing the sequentially generated amplitude and phase controlled carrier current signal samples for transmission over a communication channel in response to the single data signal applied to the data signal input of said digital control means.

12. A data communication transmitter utilizing a vector waveform generator for simultaneously generating a desired signaling waveform and performing a desired modulation process for transmission over a communication channel in response to a data signal input and comprising frequency source means for generating a data clock signal, a carrier frequency signal an a shift register clock signal, the carrier signal having three voltage components consisting of a first carrier function voltage, a second carrier function voltage of the same frequency as the first carrier function voltage and in 180° phase relationship therewith, and a third component being zero volts, vector waveform generating means comprising three electrical conductors respectively supplied with the three voltage components of the carrier signal, a plurality of first resistor means having first ends connected selectively to the two electrical conductors supplied with the first and second carrier function voltages, second ends of said first resistor means connected to the third electrical conductor supplied with the third component of zero volts, each first resistor means provided with a tap point at which is developed a weighted sum of the selected voltage components of the carrier signal thereby providing a controlled phasing or vector rotation of the resultant carrier frequency voltage signal, a like plurality of second resistor means having first ends thereof adapted to be sequentially electrically connected to the tap points of associated said first resistor means and having second ends connected to a current summing means, digital control means for producing a train of contiguous equal duration pulses in response to a single data signal applied to a data signal input of said digital control means, the duration of each pulse determined by the frequency of the clock signal applied to a clock input of said digital control means, a like plurality of switch means operatively responsive to outputs of said digital control means for sequentially electrically connecting the first end of each of said second resistor means to the tap point of the associated first resistor means, the train of contiguous pulses determining the sequence and periods time period of the nonoverlapping closed and resistor connecting states of said switch means thereby providing amplitude weighting of a like plurality of resultant sequentially generated phase controlled carrier current signal samples forming a desired signaling waveform in double side band modulated form at the output of the transmitter, and current summing means connected to the second ends of said second resistor means for summing the sequentially generated amplitude and phase controlled carrier current signal samples for transmission over a communication channel in response to the single data signal applied to the data signal input of said digital control means.

13. The data communication transmitter set forth in claim 12 wherein the resistance value of said first and second resistor means are selected to obtain equal average values of the carrier current signal samples of both positive and negative polarity sign to thereby obtain a suppressed carrier mode of transmission.

14. The data communication transmitter set forth in claim 1 wherein said current summing means comprises a current summing buss connected to the second ends of said second resistor means, and a current summing amplifier having an input connected to said current summing buss.

15. A data communication transmitter utilizing a vector waveform generator for simultaneously generating a desired signaling waveform and performing a desired modulation process for transmission over a communication channel in response to a data signal input and comprising frequency source means for generating a data clock signal, a carrier frequency signal and a shift register clock signal, the carrier frequency signal comprising a first voltage of square waveform, a second voltage in square waveform of the same frequency as the first square wave and in 90° phase lagging relationship therewith, a third voltage of square waveform of the same frequency as the first square wave and in 180° phase lagging relationship therewith, and a fourth voltage of square waveform of the same frequency as the first square wave and in 270° phase lagging relationship therewith, a vector waveform generator comprising first, second, third and fourth electrical conductors respectively supplied with the first, second, third and fourth square waveform carrier frequency voltages, a plurality of first resistors each having first ends thereof connected selectively to one of said first and third electrical conductors, a like plurality of second resistors each having first ends thereof connected selectively to one of said second and fourth electrical conductors, second ends of said first resistors respectively connected to second ends of associated said second resistors at which junctures are developed weighted sums of the selected square wave voltage components of the carrier frequency signal thereby providing a controlled phasing or vector rotation of the resultant carrier frequency voltage signal, a like plurality of third resistors having first ends thereof respectively adapted to be sequentially electrically connected to the junctures of associated said first and second resistors, a shift register for producing a train of contiguous pulses at the outputs thereof in response to a single data signal applied to a data signal input thereof, the duration of each pulse determined by the frequency of the clock signal applied to a clock input of said shift register, a like plurality of switch means operatively responsive to the pulse outputs of said shift register for sequentially electrically connecting the first ends of said third resistors to the junctures of the associated first and second resistors, the train of contiguous pulses developed at the outputs of said shift register determining the sequence and time periods of the closed states of said switch means thereby providing amplitude weighting of a like plurality of resultant sequentially generated phase controlled carrier current signal samples forming a desired signaling waveform in a single sideband modulated form, a current summing buss connected to second ends of said third resistors, and a current summing amplifier having an input connected to said current summing buss for summing the sequentially generated amplitude and phase controlled carrier current signal samples for transmission over a communication channel in response to the single data applied to the data signal input of said shift register.

16. The data communication transmitter set forth in claim 15 wherein said frequency source means comprises an oscillator for generating a relatively high frequency signal, digital logic means for performing count-down functions to establish desired lower frequency values of the data clock, carrier frequency and shift register clock signals in square waveform.

17. The data communication transmitter set forth in claim 15 wherein said plurality of said first and second resistors are each of fixed resistance value selected in accordance with the desires signaling waveform.

18. The data communication transmitter set forth in claim 15 wherein said plurality of first and second resistors are each variable in resistance value to thereby obtain desired resistance values in accordance with the desired signaling waveform.

19. The data communication transmitter set forth in claim 15 wherein said plurality of switch means consists of a like plurality of switching transistors having gate electrodes thereof electrically connected to associated outputs of said shift register.

20. The data communication transmitter set forth in claim 19 wherein said shift register is comprised of a plurality of stages of number equal to the plurality of switching transistors whereby the gate electrodes of said transistors are associated respectively with a like plurality of outputs of said shift register, the clock input of said shift register supplied with the shift register clock signal.

21. The data communication transmitter set forth in claim 19 wherein said shift register is comprised of a plurality of stages of number equal to the plurality of switching transistors divided by an integer which represents the ratio of the shift register to data clock frequencies, the clock input of said shift register supplied with the data clock signal, a plurality of logic AND gates of number equal to the plurality of said switching transistors and arranged in groups of number equal to the ratio of the shift register to data clock frequencies wherein each group thereof has a first input connected to a common associated shift register output, outputs of said plurality of AND gates connected respectively to gate electrodes of associated said switching transistors, and digital logic means having an input supplied with the shift register clock signal for cycling at the shift register clock frequency a single output pulse at a plurality of outputs thereof of number equal to the ratio of shift register to data clock frequencies, outputs of said cycling logic means connected respectively to second inputs of the AND gates in each group thereof whereby the plurality of AND gates sequentially electrically connect the junctures of th first and second resistors with the associated third resistors to form the resultant sequentially generated phase controlled carrier current signal samples.

22. The data communication transmitter set forth in claim 1 and further comprising low-pass filter means connected to the output of aid current summing means for smoothing the modulated form of the desired signaling waveform which is a stepped approximation to the desired modulated signal to thereby band-limit the modulated output waveform to the channel bandwidth.

23. The data communication transmitter set forth in claim 22 and further comprising a power amplifier connected to an output of said low-pass filter means, output of said amplifier transformer coupled to the communication channel for matching the communication channel termination impedance.

24. The data communication transmitter set forth in claim 1 and further comprising a plurality of power amplifiers having inputs respectively connected to the carrier signal outputs of said frequency source means, and outputs respectively connected to said electrical conductor means for supplying the required electric current thereto, said amplifiers being switching devices in the case of the carrier frequency signal components being of square waveform thereby providing the transmitter with capability for being manufactured by integrated circuit technology.

* * * * *